May 19, 1953     W. D. LEWIS     2,639,325
HYBRID RING
Filed March 24, 1950     2 Sheets-Sheet 1
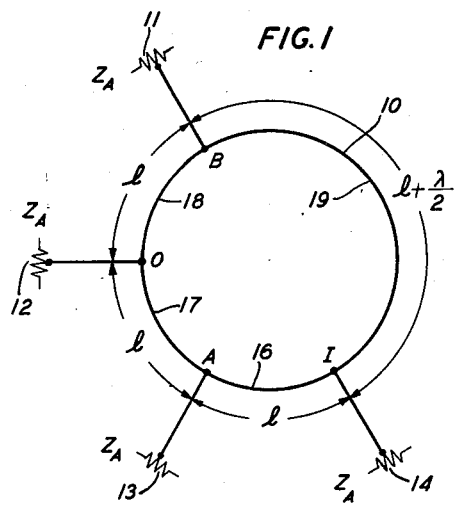
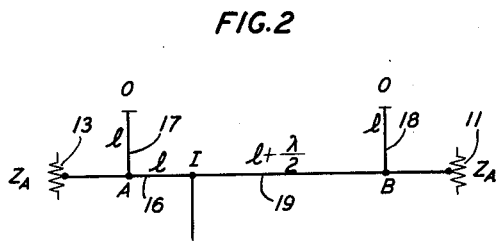
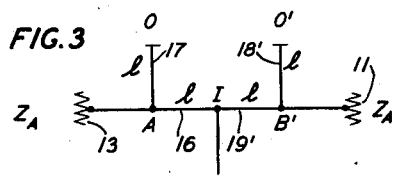
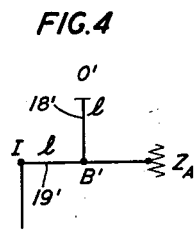
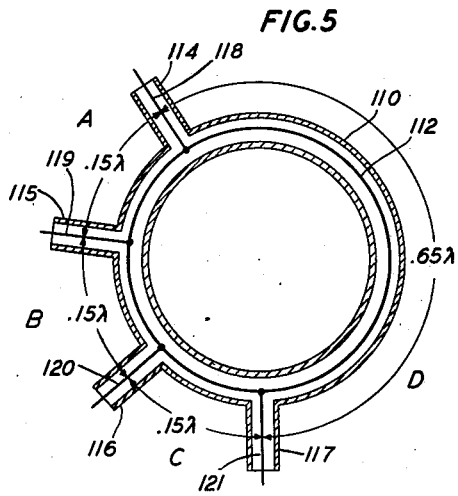
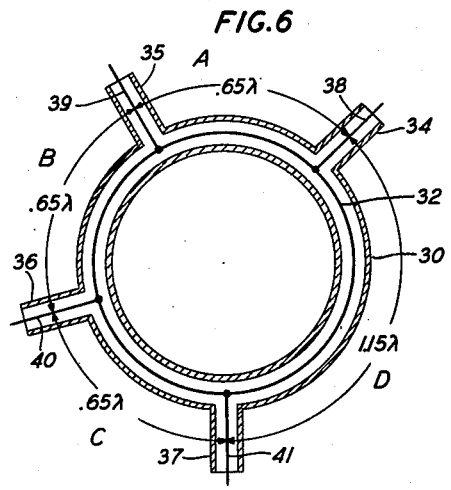
INVENTOR
W. D. LEWIS
BY H. O. Wright
ATTORNEY May 19, 1953  W. D. LEWIS  2,639,325
HYBRID RING Filed March 24, 1950  2 Sheets-Sheet 2

INVENTOR
W. D. LEWIS
BY
H. O. Wright
ATTORNEY

Patented May 19, 1953

2,639,325

UNITED STATES PATENT OFFICE 2,639,325

HYBRID RING

Willard D. Lewis, Little Silver, N. J., assignor to Bell Telephone Laboratories, Incorporated, New York, N. Y., a corporation of New York Application March 24, 1950, Serial No. 151,620

10 Claims. (Cl. 178—44)

This invention relates to hybrid rings. More particularly it relates to hybrid rings proportioned to provide favorable impedance characteristics and simplicity in construction.

Hybrid rings constructed of portions of transmission line of the coaxial, wave-guide or paired conductor types, are well known to those skilled in the art as illustrated, for example, by the numerous and varied species disclosed in United States patent 2,445,895, granted July 27, 1948, to W. A. Tyrrell, assignor to applicant's assignee. While Tyrrell employs the term "duplex-balancer" in describing his ring structures, those skilled in the art more frequently refer to such devices as hybrid rings or ring type hybrid junctions. A general description of the objective properties of a hybrid junction is given, for example, in my copending application Serial No. 789,985, filed December 5, 1947, which matured into United States Patent 2,531,447 granted November 28, 1950. While that application is concerned primarily with the wave-guide double T type of hybrid junction, the objective properties are, for many purposes, substantially identical with those of the ring type hybrid junction.

Referring particularly to Figs. 12 and 37 of Tyrrell's Patent 2,445,895, an inconvenient feature of prior art hybrid rings is the fact that the impedances required for the four circuits to be connected to the four terminals of the structure, respectively, differ from terminal to terminal.

The present invention has, therefore, as a principal object, the provision of a type of hybrid ring, or hybrid junction of the ring type, such that the impedances of all four circuits connecting to the four terminals, respectively, of the hybrid ring can be identical.

An additional object is to provide a hybrid ring type junction of transmission line having a characteristic impedance of $Z_0$ and four junction or terminal points at each of which an impedance of $Z_0$ will be found when the other three points are connected to circuits each of which has an impedance of $Z_0$.

Another object of the invention is to provide hybrid rings in which the above-mentioned uniformity of terminal impedances can be realized by structures consisting throughout of a single uniform size of transmission line for both the ring portion of the structure and for the terminal stubs of the structure.

A further object of the invention is to provide a method of proportioning a hybrid ring structure so that it can be constructed of a single uniform type of transmission line for both the ring and the terminal stubs, and four circuits having identical impedances, differing from that of the characteristic impedance of the transmission line of which the ring structure is constructed, can be connected to the four terminals, respectively, of the structure without introducing an impedance mismatch at any terminal.

Other and further objects will become apparent during the course of the following description and from the appended claims.

The principles of the invention will become apparent in connection with the detailed description, given below, of the diagrams of Figs. 1 to 4, inclusive, of the accompanying drawings, and of the specific illustrative embodiments of the invention shown in the other figures of the accompanying drawings in which:

Figs. 1 to 4, inclusive, are schematic diagrams employed in the following description to facilitate explanation of the principles underlying the operation of devices of the invention;

Fig. 5 illustrates one specific embodiment of the invention, in which the hybrid ring and connecting stubs are constructed of coaxial transmission line;

Fig. 6 illustrates a second specific embodiment of the invention, in which the hybrid ring and connecting stubs are also constructed of coaxial transmission line;

Figure 7:
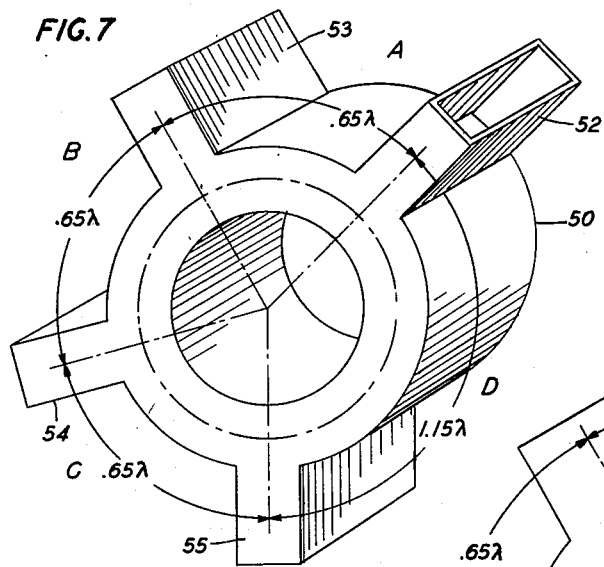
Fig. 7 illustrates a third specific embodiment of the invention, in which the hybrid ring and connecting stubs are constructed of wave-guide transmission line.

In more detail, in Fig. 1 ring, or closed loop, 10 represents a closed ring, or loop, constructed of any suitable type of transmission line such, for example, as coaxial, or waveguide, or two-wire, transmission line, having throughout the loop or ring substantially uniform mechanical and electrical characteristics and having a characteristic electrical impedance of $Z_0$. Such a ring or loop can, conveniently, be considered as comprising four arms connected in cascade to form the loop, with provisions, at each of the four junction points between adjacent arms, for connecting external circuits to the four junction points, respectively.

Points I, A, O and B represent points on the loop 10 at which stubs, or short sections, of transmission line, referred to hereinafter as terminals of the loop, of the same kind as that of which loop 10 is constructed, are connected to the transmission line constituting the loop 10. These connections can all be of the shunt type or of the series type. (See, for example, Tyrrell's above-mentioned patent for definitions and examples of series and shunt connections to two-conductor, coaxial and wave-guide transmission line.) Alternatively one or more of the connections can be series and the rest shunt connections, or vice versa.

As illustrated, three of the four interterminal spacings 16, 17 and 18, can be alike and are indicated as having a length $l$. The fourth interterminal spacing 19 is then made $(l+\lambda/2)$, where $\lambda$ is preferably the wavelength of the nominal or median frequency of the frequency range in which the device is intended to be used.

If the loop 10 is to have hybrid properties (see my above-mentioned copending application, Serial No. 789,985, now Patent No. 2,531,447 for the definition of hybrid properties) it must have two pairs of conjugately related terminals, i. e., two pairs of terminals the two terminals of each pair being so related that energy introduced at one terminal of the pair will not leave the structure at the other terminal of the same pair. That the two pairs of terminals I and O, and A and B, are, respectively, conjugately related is obvious from inspection. For example, energy introduced at I will reach O by the two paths IBO and IAO. Since the lengths of these two paths differ by $\lambda/2$ the two portions of the energy introduced at I will arrive at O exactly 180 degrees out of phase and no energy will leave the loop at terminal O. The same situation exists with respect to the relation between terminals A and B. These and a number of other relations obtaining for hybrid structures are, of course, elementary and well understood by those skilled in the art and will not, therefore, be further discussed here.

The general problem to be solved in connection with the present invention can be stated as follows: With a hybrid ring or loop of transmission line having a uniform characteristic impedance of $Z_0$, as illustrated by the diagram of Fig. 1, what should the distance $l$ be in order that a circuit having the arbitrary impedance $Z_A$ (represented by impedances 11, 12, 13 and 14 of Fig. 1, respectively) can be connected to the loop at each of the four points I, A, O and B without there being an impedance mismatch at any of the four points?

It has been demonstrated above that terminals I and O are conjugately related, i. e., that energy introduced at I will divide equally between the two paths IBO and IAO (since both paths have the same characteristic impedance $Z_0$) and the two portions of the energy will arrive at O in phase opposition. The situation in such a case is precisely similar from an electrical standpoint to that which would exist if a short circuit were placed across the loop of transmission line at the point O.

To facilitate consideration of the circuit of the diagram of Fig. 1 for the case in which energy is introduced into terminal point I, we can redraw it in straight-line form as shown in Fig. 2. That is, going from point I toward the right we find a length of transmission line 19 $(l+\lambda/2)$ long, before reaching point B. At point B we find two additional circuits connected, we will assume for the present analysis, in parallel. (It will be apparent as the analysis proceeds that a series connection could equally well be assumed.) Of the two additional circuits, one is a length of loop transmission line 18, $l$ long, terminated effectively (at point O) in a short circuit, i. e., an impedance of zero, and the other is a circuit terminated in an impedance 11 of $Z_A$. As is well known to those skilled in the art, if the line connecting imped- ance $Z_A$ to point B has a length of $n\lambda/2$ where $n$ is any whole integer, the impedance of the circuit at point B will also be $Z_A$. For all four terminal points I, A, O and B it will be assumed that the impedance $Z_A$ is effectively connected at its associated terminal point, or is connected by a line $n\lambda/2$ long.

Similarly, going from point I toward the left we find a length of line 16, $l$ long, before reaching point A and at A we find two impedances connected in parallel, one being the length of line 17, $l$ long, terminated, effectively (at point O), in a short circuit, the other being impedance 13, $Z_A$.

Since we are, in this instance, interested only in the impedances, at point I, of the right and left portions of the circuit of Fig. 2, just described, we can omit the half wavelength portion of member 19 of Fig. 2. This gives us directly the diagram of Fig. 3, i. e., we replace 19 of Fig. 2 by 19' of Fig. 3. Terminal points B and O at the right side of Fig. 2 are designated B' and O' in Fig. 3 and line 18 is designated 18' to indicate that, though the impedance has not been changed, the phase relations have been changed 180 degrees by removal of the $\lambda/2$ length of line.

From the standpoint of impedance at point I, then, we have, effectively, like right and left portions, Fig. 4 representing the left portion of the circuit of Fig. 3. Since these two portions are in parallel and are of the same impedance each must have an impedance of $2Z_A$ at point I if the total impedance at terminal I is to be $Z_A$, in accordance with the requirements stated in the problem to be solved by the invention, above.

From the "Radio Engineer's Handbook," by F. E. Terman, published by McGraw-Hill Book Company, Incorporated, New York, 1943, Equation 62, at page 182, the impedance $Z_S$ at one end of a length of transmission line, having a characteristic impedance of $Z_0$ and terminated at the other end in an impedance $Z_L$ is the following:

$$Z_S = Z_0 \frac{\frac{Z_L}{Z_0}\cos\left(\frac{2\pi l}{\lambda}\right) + j\sin\left(\frac{2\pi l}{\lambda}\right)}{\cos\left(\frac{2\pi l}{\lambda}\right) + j\frac{Z_L}{Z_0}\sin\left(\frac{2\pi l}{\lambda}\right)} \quad (1)$$

where $l$ is the length of the line and $\lambda$ is the wavelength of the energy with respect to which the impedance is to be measured.

Dividing both the numerator and denominator of Equation 1 above by $$\cos\frac{2\pi l}{\lambda}$$

and setting $$\theta = \frac{2\pi l}{\lambda}$$

we obtain $$Z_S = Z_0 \frac{\frac{Z_L}{Z_0} + j\tan\theta}{1 + j\frac{Z_L}{Z_0}\tan\theta} \quad (2)$$

Applying this equation to the line section 18' of Fig. 4, its impedance $Z'_S$ at point B' is $$Z'_S = Z_0 \frac{\frac{Z_L}{Z_0} + j\tan\theta}{1 + j\frac{Z_L}{Z_0}\tan\theta} \quad (3)$$

since $Z_L=0$ (i. e., 18' is effectively short-circuited at O') Equation 3 reduces to $$Z'_S = j\tan\theta\,(Z_0) \quad (4)$$

Setting $Z_A = kZ_0$ we have, for the parallel combination of $Z'$s and $Z_A$ at point $B'$ of Fig. 4, $$Z''_s = \frac{1}{\frac{1}{kZ_0} + \frac{1}{j \tan \theta Z_0}} = \frac{Z_0 k \, j \tan \theta}{k + j \tan \theta} \quad (5)$$

i. e., Equation 5 or $$Z''_s$$

is the impedance terminating line section 19' at point B' of Fig. 4, so that for the impedance $$Z'''_s$$

of line section 19' at point I we obtain $$Z'''_s = Z_0 \frac{\frac{kj \tan \theta}{k+j \tan \theta} + j \tan \theta}{1 + j \frac{kj \tan \theta}{k+j \tan \theta} \tan \theta} \quad (6)$$

which reduces to $$Z'''_s = Z_0 \frac{2kj \tan \theta - \tan^2 \theta}{k(1 - \tan^2 \theta) + j \tan \theta} \quad (7)$$

Since the diagram of Fig. 3 is symmetrical, the impedance of the circuit to the left of point I will, as explained above, also have the impedance $$Z'''_s$$

as given by Equation 7 and, as is also explained above, in order for the impedance at point I to be $Z_A$, it is obvious that $$Z'''_s$$

must equal $2Z_A$ which in turn is $2kZ_0$, since $Z_A = kZ_0$.

Therefore:

$$Z_0 \frac{2kj \tan \theta - \tan^2 \theta}{k(1 - \tan^2 \theta) + j \tan \theta} = 2kZ_0 \quad (8)$$

Dividing both sides of Equation 8 by $Z_0$ and multiplying both sides by the denominator of the left-hand side, we obtain:

$$2kj \tan \theta - \tan^2 \theta = 2k^2(1 - \tan^2 \theta) + 2kj \tan \theta \quad (9)$$

whence $$-\tan^2 \theta = 2k^2(1 - \tan^2 \theta) \quad (10)$$

$$\frac{-\tan^2 \theta}{2k^2} = 1 - \tan^2 \theta \quad (11)$$

$$\tan^2 \theta \left(1 - \frac{1}{2k^2}\right) = 1 \quad (12)$$

$$\tan \theta = \frac{1}{\sqrt{1 - \frac{1}{2k^2}}} \quad (13)$$

For the value $$k = \frac{1}{\sqrt{2}}$$

in Equation 13, tan $\theta$ becomes indeterminate. For values of $k$ less than $$\frac{1}{\sqrt{2}}$$

in Equation 13, tan $\theta$ becomes "imaginary." For any value of $k$ which is greater than $$\frac{1}{\sqrt{2}}$$

(approximately 0.707) in Equation 13, tan $\theta$ is real.

This means, obviously, that the "arbitrary" impedance, $Z_A$, chosen to terminate the four arms of a hybrid ring constructed of transmission line having a characteristic impedance $Z_0$, can have any value greater than $$\frac{1}{\sqrt{2}} Z_0$$

provided an appropriate value of $l$ is chosen for use with the specific value assigned to $Z_A$. Furthermore, as $k$ is increased in value, tan $\theta$ approaches 1 and $l$ approaches $\frac{1}{8}\lambda$ as will appear obvious from the following examples.

As postulated above $$\theta = \frac{2\pi l}{\lambda}$$

whence $$l = \frac{\lambda \theta}{2\pi} \quad (14)$$

By way of specific illustrative examples, values of the interterminal length $l$, for eight values of $k$ are tabulated below.

*Table I*

| $k$ | tan $\theta$ | $\theta$ | $l$ |
|---|---|---|---|
| | | Degrees | |
| .72 | 5.3 | 79.3 | .2203$\lambda$ |
| .75 | 3.0 | 71.5 | .1986$\lambda$ |
| .80 | 2.1367 | 65 | .180$\lambda$ |
| 1.00 | 1.414 | 55 | .150$\lambda$ |
| 2.00 | 1.143 | 48.8 | .136$\lambda$ |
| 4.00 | 1.016 | 45.5 | .1264$\lambda$ |
| 5.00 | 1.010 | 45.3 | .1258$\lambda$ |
| ∞ | 1.000 | 45.0 | .1250$\lambda$ |

From inspection of the above-tabulated data, it is apparent that four-terminal hybrid rings of the invention constructed of uniform transmission line having a characteristic impedance of $Z_0$, in which three of the interterminal spacings are alike and fall within the range of approximately $\frac{1}{4}\lambda$ maximum to $\frac{1}{8}\lambda$ minimum, inclusive, and the fourth interterminal spacing of which exceeds the other three by $\frac{1}{2}\lambda$, will have the property that all terminals can be connected to circuits having the same impedance. The precise value of this impedance for any particular structure, of course, can be determined from the above Formulas 13 and 14 as described above.

As will be described below in detail, in connection with specific illustrative structures, in any hybrid ring structure of the invention, all four interterminal spacings can be increased by any desired number of additional half wavelengths without disturbing the balance or terminal impedances of the structure. Also, any one or more of the four interterminal spacings of a hybrid ring structure of the invention can be increased by one or more full wavelengths, independently of the other interterminal spacings, without disturbing the balance or terminal impedances of the structure.

From Table I above, of values of $k$, $\theta$ and $l$, it is also apparent that as $k$ is increased, $\theta$ approaches 45 degrees as a limit and $l$ approaches $\frac{1}{8}\lambda$. For most practical purposes, where $k$ exceeds 5, $l$ can be taken as $\frac{1}{8}\lambda$ without introducing any significant unbalance or impedance irregularities.

This means that for most purposes, any value of $Z_A$ that is at least in the order of five times or more larger than the $Z_0$ of the hybrid ring transmission line can be employed with a ring having three interterminal intervals of $\frac{1}{8}\lambda$ each and the fourth interval of $\frac{5}{8}\lambda$.

By way of further illustration, a few specific structures of the invention will now be described in detail.

In Fig. 5, inner conductor 112 and outer conductor 110 comprise a ring of coaxial transmission line, to which four terminal stubs of the same size and type of coaxial transmission line as that which constitutes the ring portion are connected. The outer conductor members of these four stubs are designated 114 to 117, inclusively, respectively, and connect to outer conductor 110 of the ring as shown. The inner conductor members of these four stubs are designated 118 to 121, inclusive, respectively, and connect to the inner conductor 112 of the ring as shown. The outer conductors of the ring and stubs are tubes of circular cross-sectional area, these outer conductors being shown in Fig. 5 in plan cross-sectional view so that the inner conductors are readily seen.

The spacings between the center lines (or longitudinal axes) of adjacent stubs, which spacings are designated for ready references A, B, C and D, respectively, as shown, are proportioned in accordance with the formulas given above so that for A, B and C, each interval is .15λ; and for D, the interval is .65λ. These spacings are, of course, measured along the longitudinal center line of the inner conductor 12 of the coaxial ring. λ is the wavelength of the median frequency of the band of frequencies with which the structure is designed to operate as a hybrid structure.

When so proportioned, the ring and all four stubs can be constructed of the same type and size of coaxial transmission line, as shown, and the characteristic electrical impedances of all four terminals will be the same. This structure is, therefore, extremely simple in physical construction and, from an electrical standpoint, simplifies the problem of matching the impedances of circuits connecting to any of the terminals since all connecting circuits can be designed to match a single impedance. This impedance will be, in this specific case, the same as the characteristic impedance of the coaxial line of which the structure is constructed.

An elementary analysis will show that if all four interterminal intervals are increased by ½λ each, the hybrid properties if the ring structure will still be retained. Fig. 6 illustrates this modification of the structure of Fig. 5.

In Fig. 6 a second specific form of coaxial transmission line hybrid ring of the invention is shown and comprises inner conductor 32, outer conductor 30 and four coaxial terminals connected to the coaxial ring formed by conductors 32, 30. The four outer conductors of these coaxial terminals are designated 34 to 37, inclusive, respectively, and all connect to outer conductor 30 of the ring as shown. The four inner conductors of these coaxial terminals are designated 38 to 41, inclusive, respectively, and all connect to inner conductor 32 of the ring as shown.

In the case of Fig. 6, three of the interterminal spacings, measured along the longitudinal axis of conductor 32, are each .65λ and the fourth spacing is 1.15λ, as indicated. These intervals are not to scale in Fig. 6 as the structure would then become too large for convenient illustration. In other words, the structure of Fig. 6, as stated above, differs from that of Fig. 5, only in that each of the four interterminal spacings has been increased by .5λ.

The structure of Fig. 6 will have the same desirable properties as were described above for that of Fig. 5, i. e., the ring and all four terminals can be constructed of the same size and type of coaxial transmission line, and the impedance of each of the four terminals will be equal to the characteristic impedance $Z_0$ of the coaxial line ring when the other three terminals are connected to circuits each of which has the impedance $Z_0$. Any additional number of half wavelengths, as may be desired to provide a structure of convenient mechanical size, can be added to all four of the interterminal spacings which are specified in Fig. 5, and the resulting structure will have the desirable properties described above for the structures of Figs. 5 and 6. As a further example (not illustrated), a ring in which three of the spacings are made 1.65λ and the fourth is made 2.15λ will have the desired properties above mentioned.

Alternatively, or conjointly, any number of whole wavelengths can be added to any interterminal spacing independently of the other interterminal spacings, without affecting the functioning or any of the terminal impedances of the structure. Great flexibility in mechanically proportioning structures of the invention is thus afforded. This flexibility constitutes a very real and outstanding advantage since it readily permits selecting terminal interspacings such that the over-all hybrid structure can be mechanically assembled and connected to all associated coaxial structures with which it is to be used without congestion, interference, or other problems which sometimes arise when several coaxial lines must be connected to an inconveniently small junction device.

The principles of the invention are also directly applicable to hybrid rings of wave-guide transmission line, except that interterminal spacings of the order of .15λ as used in Fig. 5 cannot ordinarily be conveniently applied to wave-guide structures. This arises from the fact that the cross-sectional dimensions of wave guides are usually relatively large (i. e., approximately ½λ by ¼λ, for example) and the wave-guide terminals cannot, therefore, ordinarily be positioned, center to center, as close as .15λ along the circular axis, or center line, of the ring. Accordingly, the smallest practicable wave-guide hybrid ring junction of the invention will usually have three interterminal spacings of the order of .65λ and one of the order of 1.15λ, as shown in Fig. 7.

In Fig. 7, 50 is a ring of wave-guide transmission line having rectangular cross-sectional dimensions, for example, of .5λ by .25λ, where λ is the wavelength of the median frequency with which the structure is to be employed. In Fig. 7 the sides of the wave guide, which are approximately .25λ, form the sides of the ring as shown. Four terminal stubs of wave guides 52 to 55, inclusive, respectively, having the same cross-sectional dimensions as the wave guide of which the ring 50 is constructed are connected to the outer periphery of the ring 50. They are spaced from each other so that measured along the center line of a side of the ring structure, as indicated, three of the interterminal spacings (A, B and C) (center to center) are .65λ and the fourth (D) is 1.15λ. As for the coaxial structures of Figs. 5 and 6, all terminals of the structure of Fig. 7 will have the same impedance, which impedance will be the characteristic impedance $Z_0$ of the wave-guide transmission line of which the ring is constructed.

Figure 8:
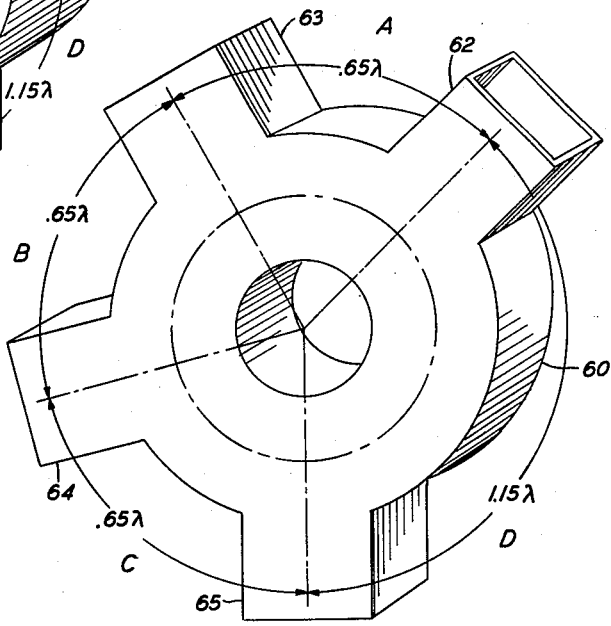
Fig. 8 illustrates a further specific embodiment of the invention, in which the hybrid ring and connecting stubs are constructed of wave-guide transmission line.

The structure of Fig. 8 is similar to that of Fig. 7 except that the sides of the ring 60 correspond to the larger cross-sectional dimension of the wave-guide transmission line from which the ring is formed, i. e., the sides can be, for example, each approximately $\frac{1}{2}\lambda$ and the innermost and outermost surfaces of the ring are each approximately $\frac{1}{4}\lambda$ (transverse dimensions).

The four terminals 62 to 65, inclusive, respectively, connect to the periphery of ring 60 as shown. Three interterminal spacings (A, B and C) measured along the center line of the side of the ring 60 are .65λ (center to center) and the fourth (D) is 1.15λ.

To obtain wave-guide hybrid rings of larger size of either one of the two types illustrated by Figs. 7 and 8 which will retain the equality of terminal impedances, it is simply necessary to increase all four interterminal spacings A, B, C and D by the same integral number of half wavelengths necessary to produce a ring of the size desired. Also, as described above in connection with coaxial structures, any one or more of the interterminal spacings can be increased by any number of whole wavelengths, as may be deemed convenient, without affecting the desirable properties of the structure.

The above-described four specific structures of Figs. 5 to 8, inclusive, have obviously been based on a value of $k$ equal to 1, i. e., the impedances of all four circuits to be connected to the four terminals of these specific structures should be the same as the characteristic impedance $Z_0$ of the transmission line of which the hybrid ring is constructed.

In general, three of the interterminal spacings or intervals can be the same and the fourth interterminal spacing can be $$\frac{\lambda}{2}$$

greater than the other three. Designating the three equal spacings as $l$, as shown in Fig. 1, the fourth is then $$l + \frac{\lambda}{2}$$

As explained in detail above, $$l = \frac{\lambda \theta}{2\pi}$$

Equation 14, where $\theta$ can be determined from Equation 13, i. e., $$\tan \theta = \frac{1}{\sqrt{1 - \frac{1}{2k^2}}}$$

where $$k = \frac{Z_A}{Z_0}$$

$Z_0$ = the characteristic impedance of the transmission line of which the hybrid ring is constructed, and $Z_A$ is the impedance of all four circuits which are to be connected to the four terminals, respectively, of the hybrid ring.

Taking account of the fact that any number of half wavelengths can be added to all four interterminal spacings or intervals, if desired, and the fact that any one or more of the interterminal spacings or intervals can be increased by one or more full wavelengths without disturbing the balance or impedance relations of a structure of the invention, we can state the requirements generally by the following relations:

$$l_1 = l_2 = l_3 = \left[\frac{\lambda \theta}{2\pi} + n\frac{\lambda}{2}\right] + m\lambda \quad (15)$$

$$l_4 = \left[\frac{\lambda \theta}{2\pi} + (n+1)\frac{\lambda}{2}\right] + m\lambda \quad (16)$$

In (15) and (16), $$\theta = \tan^{-1} \frac{1}{\sqrt{1 - \frac{1}{2k^2}}}$$

$\lambda$ = wavelength, and $$k = \frac{Z_A}{Z_0}$$

$n = 0$ or any whole positive integer and must be the same for all four spacings.

$m = 0$ or any whole positive integer and need not be the same for any two of the four spacings.

Figure 9:
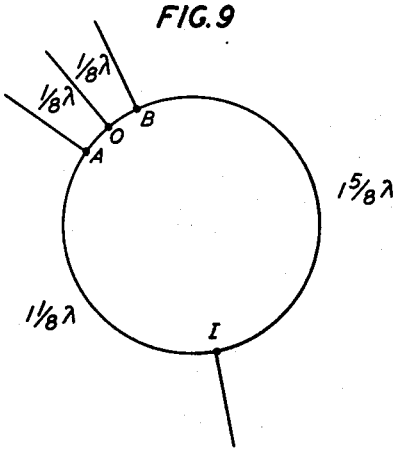
Fig. 9 illustrates in diagrammatic form another specific embodiment of the invention in which two interterminal intervals are increased by a whole wavelength of transmission line.

In Fig. 9, the arrangement of a further form of hybrid ring of the invention, in which the impedance $Z_A$ connected to the ring at each of the junction points I, A, O, B, can be of any value greater than five times the characteristic impedance $Z_0$ of the transmission line of which the ring is constructed, is shown. As shown, the interval between points I and A is $1\frac{1}{8}\lambda$. The interval between points A and O is $\frac{1}{8}\lambda$, as is also that between points O and B. The interval between points I and B is $1\frac{5}{8}\lambda$. Obviously, the intervals between I and A and between I and B each includes a full extra wavelength in addition to the minimum required length of transmission line for these intervals. As mentioned hereinabove, as long as the impedances of all four circuits connected to the four junction points I, A, O and B, respectively, are of the same impedance and are greater than five times the characteristic impedance of the transmission line of which the ring is constructed, there will be substantially no impedance mismatch at any of the four junction points.

Figure 10:
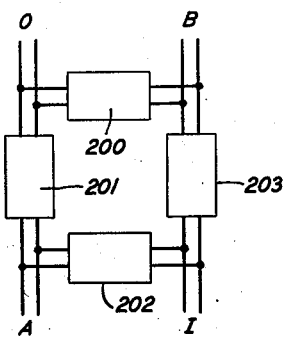
Fig. 10 illustrates in block schematic diagram form a further specific embodiment of the invention which constitutes a hybrid ring junction of the invention constructed of low frequency lumped-element networks.

In Fig. 10, a hybrid ring, or loop, of the invention, the four arms of which are composed of lumped element networks, is shown. Such hybrid rings, or loops, can be employed in frequency ranges where the suitable lengths of simple transmission lines to compose such a ring, or loop, are of inconveniently great length.

The four arms comprising the four-terminal networks 200, 201, 202 and 203 are variously known as "artificial lines" or "delay networks" and are constructed of "lumped elements" (i. e., coils, condensers, and in some instances resistances also) in accordance with principles long well known in the art. For operation of the resulting hybrid structure over relatively narrow frequency ranges, these networks can be of the simple forms illustrated, by way of example, in Fig. 7 of United States Patent 2,410,144, granted October 29, 1946, to W. A. Tyrrell, assignor to applicant's assignee. For hybrid rings, or loops, to operate over relatively wide-band frequency ranges, the more complex type of all-pass delay networks described at page 8, columns 1 and 2 of United States Patent 1,828,454, granted October 20, 1931, to H. W. Bode, assignor to applicant's assignee, can preferably be employed. Networks 200, 201 and 202 are each designed to have, over the frequency band in which they are to be employed, the phase characteristic postulated by Equation 15 above. Likewise, network 203 is designed to have over the same frequency band the phase characteristic postulated by Equation 16 above.

As explained by the above-mentioned patent 2,445,895 of W. A. Tyrrell in connection with Figs. 2 and 4 of the patent, wave-guide connections in the E plane (such as are used in the structure of Fig. 7 of the present application) are effectively series connections and wave-guide connections in the H plane (as in the structure of Fig. 8 of the present application) are effectively parallel connections.

Any of the numerous and varied alternative types of connections well known to the art, including those disclosed in Tyrrell's above-mentioned patent, can obviously be used in structures of the invention in place of the types shown in Figs. 5 to 8, inclusive, of the present application without departing from the spirit and scope of the invention.

Likewise, numerous and varied special types of transmission lines or wave guides can be employed in the construction of hybrid rings or loops of the instant invention. Indeed, the rings or loops need not be circular but can, obviously, be oval, rectangular, or of irregular shape so long as the prescribed effective electrical lengths of the four arms of the loop are obtained.

No attempt has here been made to exhaustively cover the full range of equivalents since these will readily occur to persons skilled in the art.

What is claimed is:

1. An electrical hybrid junction adapted to join four external electrical circuits, each having a predetermined impedance of $Z_A$, said junction comprising a closed loop of uniform transmission line having a characteristic impedance of $Z_0$ and four connection points spaced along said loop, three of the intervals between said connection points along said loop, each being $$\frac{\lambda\theta}{2\pi}+n\frac{\lambda}{2}+m\lambda$$

and the fourth interval being $$\frac{\lambda\theta}{2\pi}+(n+1)\frac{\lambda}{2}+m\lambda$$

where $\theta$ is the angle whose tangent is $$\frac{1}{\sqrt{1-\frac{1}{2k^2}}}$$

$\lambda$ is the wavelength of the energy to be transmitted through the junction, $k$ is the ratio of impedance $Z_A$ to impedance $Z_0$ and is greater than $$\frac{1}{\sqrt{2}}$$

$n$ is zero or any positive integer and is the same for all four intervals, and $m$ is zero or any positive integer and need not be the same for any two or more of the four intervals.

2. An electrical hybrid junction adapted to join four external electrical circuits, each having a predetermined impedance of $Z_0$, said junction comprising a closed loop of uniform transmission line having a characteristic impedance of $Z_0$ and four connection points spaced along said loop, three of the intervals between said connection points each being $.15\lambda$, the fourth interval between connection points being $.65\lambda$ where $\lambda$ is the wavelength of the energy to be transmitted through said junction.

3. The hybrid junction of claim 2 in which all four interconnection point intervals are increased in length by $$n\frac{\lambda}{2}$$

where $n$ is any positive integer.

4. The hybrid junction of claim 2 in which one or more of the four interconnection point intervals are increased by $m\lambda$ where $m$ is any positive integer.

5. An electrical hybrid junction comprising four arms connected in cascade to form a closed electrical loop circuit, each of said arms having a characteristic impedance of $Z_0$, in which the electrical length of three of the four arms is $$\frac{\lambda\theta}{2\pi}+n\frac{\lambda}{2}+m\lambda$$

and the electrical length of the fourth arm is $$\frac{\lambda\theta}{2\pi}+(n+1)\frac{\lambda}{2}+m\lambda$$

where $\theta$ is the angle whose tangent is $$\frac{1}{\sqrt{1-\frac{1}{2k^2}}}$$

$\lambda$ is the wavelength of the energy to be transmitted through the junction, $k$ is the ratio of a predetermined impedance $Z_A$, assigned to four external circuits to which the four interarm junction points are to be connected, respectively, to the characteristic impedance $Z_0$, $k$ being greater than $$\frac{1}{\sqrt{2}}$$

$n$ is zero or a positive integer and is the same for all four arms, and $m$ is zero or any positive integer and need not be the same for any two or more of the four arms.

6. The junction of claim 1, in which the uniform transmission line is of the coaxial type.

7. The junction of claim 1, in which the uniform transmission line is of the wave-guide type.

8. The junction of claim 2, in which the uniform transmission line is of the coaxial type.

9. The junction of claim 2, in which all four interconnection point intervals are increased in length by $$n\frac{\lambda}{2}$$

where $n$ is the same for all intervals and is any positive integer and the uniform transmission line is of the wave-guide type.

10. The junction of claim 2, in which all four interconnection point intervals are increased in length by $$n\frac{\lambda}{2}$$

where $n$ is the same for all intervals and is any positive integer, and any of the four interconnection point intervals are additionally increased by $m\lambda$ where $m$ is any positive integer and need not be the same for any two of the intervals.

WILLARD D. LEWIS.

References Cited in the file of this patent

UNITED STATES PATENTS

| Number | Name | Date |
|---|---|---|
| 2,147,809 | Alford | Feb. 21, 1939 |
| 2,436,828 | Ring | Mar. 2, 1948 |
| 2,445,895 | Tyrrell | July 27, 1948 |

FOREIGN PATENTS

| Number | Country | Date |
|---|---|---|
| 615,355 | Great Britain | Jan. 5, 1949 |